United States Patent
Inoguchi et al.

(10) Patent No.: US 8,452,530 B2
(45) Date of Patent: May 28, 2013

(54) NAVIGATION DEVICE THAT PERFORMS PATHFINDING IN CONSIDERATION OF CONGESTION INFORMATION IN PLURAL AREAS USING AVERAGE SPEED IN THE PLURAL AREAS

(75) Inventors: Toshio Inoguchi, Nagoya (JP); Kazutaka Yoshikawa, Tokyo (JP); Tomoyuki Zaitsu, Tokyo (JP)

(73) Assignees: Toyota Jidosha Kabushiki Kaisha, Toyota-shi (JP); Aisin Aw Co., Ltd., Anjyo-shi (JP)

( * ) Notice: Subject to any disclaimer, the term of this patent is extended or adjusted under 35 U.S.C. 154(b) by 362 days.

(21) Appl. No.: 12/444,002

(22) PCT Filed: Oct. 1, 2007

(86) PCT No.: PCT/JP2007/069216
§ 371 (c)(1),
(2), (4) Date: Apr. 30, 2009

(87) PCT Pub. No.: WO2008/041679
PCT Pub. Date: Apr. 10, 2008

(65) Prior Publication Data
US 2010/0010735 A1    Jan. 14, 2010

(30) Foreign Application Priority Data

Oct. 3, 2006 (JP) .................................. 2006-271996

(51) Int. Cl.
*G01C 21/00* (2006.01)
(52) U.S. Cl.
USPC .......................................................... 701/414
(58) Field of Classification Search
None
See application file for complete search history.

(56) References Cited

U.S. PATENT DOCUMENTS

| | | | |
|---|---|---|---|
| 2005/0222761 A1* | 10/2005 | Uyeki et al. | 701/209 |
| 2006/0004511 A1 | 1/2006 | Yoshikawa et al. | |
| 2006/0047422 A1* | 3/2006 | Fukumi | 701/209 |
| 2006/0229807 A1* | 10/2006 | Sheha et al. | 701/209 |
| 2007/0290839 A1* | 12/2007 | Uyeki et al. | 340/539.13 |
| 2008/0094250 A1* | 4/2008 | Myr | 340/909 |
| 2008/0109162 A1* | 5/2008 | Chen et al. | 701/210 |
| 2010/0241344 A1* | 9/2010 | Nagase et al. | 701/118 |

FOREIGN PATENT DOCUMENTS

| | | |
|---|---|---|
| JP | 2007-218777 A | 8/1977 |
| JP | 2004-170377 A | 6/2004 |
| JP | 2004-257794 A | 9/2004 |
| JP | 2006-017610 A | 1/2006 |
| JP | 2007-218777 A | 8/2007 |
| JP | 2007-271474 A | 10/2007 |

* cited by examiner

*Primary Examiner* — Thomas Tarcza
*Assistant Examiner* — Adam Alharbi
(74) *Attorney, Agent, or Firm* — Kenyon & Kenyon LLP

(57) ABSTRACT

A navigation device divides a pathfinding range into plural areas and performs pathfinding in consideration of congestion information. The navigation device includes a forecast congestion information generating unit configured to generate forecast congestion information corresponding to a predetermined time based on traffic information; and a forecast congestion information applying unit configured to apply, to each of the areas, the forecast congestion information corresponding to a time when a vehicle arrives in each of the areas. The navigation device includes an area setting unit configured to set regions divided by concentric circles centering around a present location, as the plural areas. The radius of the concentric circles is incremented by a fixed length that is set beforehand for each region or each time zone.

5 Claims, 8 Drawing Sheets

NAVIGATION DEVICE THAT PERFORMS PATHFINDING IN CONSIDERATION OF CONGESTION INFORMATION IN PLURAL AREAS USING AVERAGE SPEED IN THE PLURAL AREAS

This is a 371 national phase application of PCT/JP2007/069216 filed 1 Oct. 2007, which claims priority to Japanese Patent Application No. 2006-271996 filed 3 Oct. 2006, the contents of which are incorporated herein by reference.

TECHNICAL FIELD

The present invention relates to a navigation device for performing pathfinding in each predetermined area, and more particularly to a navigation device for performing pathfinding by applying appropriate forecast traffic congestion information corresponding to the time when the vehicle is expected to arrive at each area.

BACKGROUND ART

Conventionally, there is known a navigation system for guiding the way to a specified destination by finding the path to the destination. Such a navigation system includes a storage device, a pathfinding process unit, and a forecast process unit. The storage unit stores pathfinding data, map data including information regarding areas, and traffic information. The pathfinding process unit finds plural paths to the destination, and if any of the paths passes through a predetermined area, a forecast passing time is calculated for a link within the predetermined area. Based on traffic information, the forecast process unit creates forecast traffic information corresponding to the forecast passing time for the link within the predetermined area (see patent document 1).

The navigation system creates forecast traffic information after calculating the forecast passing times for all of the links within the predetermined area, and therefore the optimum path can be presented to the driver, in consideration of the ever-changing traffic congestion conditions.

Patent Document 1: Japanese Laid-Open Patent Application No. 2006-17610

However, in the navigation system described in patent document 1, as the number of predetermined areas or the number of links in a predetermined area increases, the amount of calculation operations increases for obtaining the forecast passing times. Consequently, the calculation workload on the control device increases.

Accordingly, there is a need for a navigation device capable of presenting an appropriate path to the driver in consideration of the ever-changing traffic congestion conditions, with reduced calculation workload.

DISCLOSURE OF THE INVENTION

The present invention may solve one or more problems of the related art.

According to an aspect of the present invention, there is provided a navigation device for dividing a pathfinding range into plural areas and performing pathfinding in consideration of congestion information, the navigation device including a forecast congestion information generating unit configured to generate, based on traffic information, forecast congestion information corresponding to a predetermined time; and a forecast congestion information applying unit configured to apply, to each of the plural areas, the forecast congestion information corresponding to a time when a vehicle arrives in each of the plural areas.

A preferred embodiment of the present invention may provide a navigation device capable of presenting an appropriate path to the driver in consideration of the ever-changing traffic congestion conditions, with reduced calculation workload.

Figure 1:
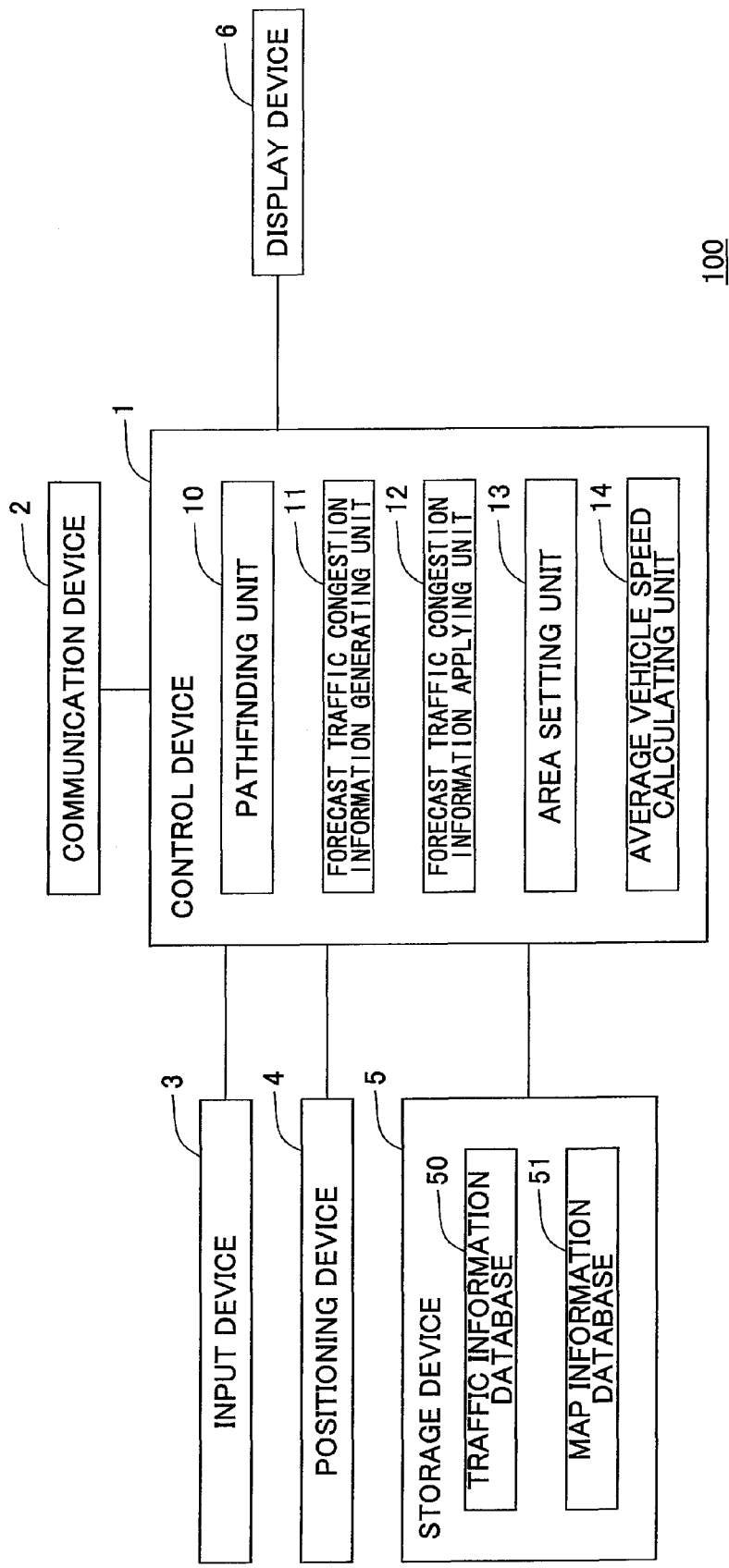
FIG. 1 illustrates a configuration example of a navigation device.

EXPLANATION OF REFERENCES 1 control device
2 communication device
3 input device
4 positioning device
5 storage device
6 display device
10 pathfinding unit
11 forecast traffic congestion information generating unit
12 forecast traffic congestion information applying unit
13 area setting unit
14 average vehicle speed calculating unit
100 navigation device
C1~C3 target area
J1~J6 traffic congestion section
P present location
Q sectoral area
R1~R10 areas
S1~S3 auxiliary areas
T destination

BEST MODE FOR CARRYING OUT THE INVENTION

A description is given, with reference to the accompanying drawings, of an embodiment of the present invention.

FIG. 1 illustrates a configuration example of a navigation device 100 according to the present invention. The navigation device 100, which is an in-vehicle device, includes a control device 1, a communication device 2, an input device 3, a positioning device 4, a storage device 5, and a display device 6.

The control device 1 is a computer including a CPU (Central Processing Unit), a RAM (Random Access Memory), and a ROM (Read Only Memory). Programs corresponding to a pathfinding unit 10, a forecast traffic congestion information generating unit 11, a forecast traffic congestion information applying unit 12, an area setting unit 13, and an average vehicle speed calculating unit 14 are stored in the ROM, and the programs are loaded into the RAM to allow the CPU to execute the corresponding process.

The communication device 2 is for controlling communications between the navigation device 100 and external facilities such as a communication center. For example, the communication device 2 controls wireless communications using mobile phone frequencies or specific energy-saving frequencies, and functions as a receiving device for receiving signals from an external facility and a transmitting device for transmitting signals to an external facility.

The communication device 2 receives VICS (Vehicle Information and Communication System) information that is transmitted from an optical beacon, a radio wave beacon, or an FM radio station, and also receives traffic congestion information from communication devices used for road-to-vehicle communication which are built along the roads on which the vehicle is traveling.

The input device 3 is for receiving operation input to the navigation device 100. Examples of the input device 3 are an escutcheon switch, a touch panel, a joystick, and a remote controller. The input device 3 is used for inputting the destination, etc., on a screen displayed on the display device 6.

The positioning device 4 is for locating the position of the vehicle. For example, the positioning device 4 positions/calculates the position of the vehicle based on GPS (Global Positioning System) signals output by a GPS satellite, which are received via a GPS antenna with a GPS receiver. The positioning method can be any method such as single positioning or differential positioning (including interferometric positioning). However, the differential positioning method is preferably used, as highly precise performance can be achieved.

The position of the vehicle (vehicle in which the navigation device 100 is mounted) can be corrected based on output from various sensors such as a rudder angle sensor, a vehicle speed sensor, and a gyro sensor, or based on various information items received via a beacon receiver and an FM multiplex receiver.

The storage device 5 is a device for storing various information items used for navigation, for example, a hard disk for storing a traffic information database 50 or a map information database 51.

The traffic information database 50 systematically stores traffic information. For example, the traffic information database 50 stores VICS information updated every five minutes, corresponding to a predetermined period of time of the past (for example, one year).

The "traffic information" is constituted by traffic congestion information and traffic regulation information that are created by collecting information from a traffic control system, and includes elements expressing the time required to pass through each of the links in the respective traveling directions (hereinafter, "link travel time").

A "link" is a unit constituting a road, which divides the road at every junction of three streets, for example. Each of the links constituting a road is given a road link ID as an identification number.

The map information database 51 systematically stores map information. For example, the map information database 51 stores the relationship between image information and a road link ID, and the connection relationship between different road link IDs.

The display device 6 is for displaying map information and search results of paths. For example, the display device 6 may be a liquid crystal display or an organic EL (Electro-Luminescence) display.

Next, a description is given of the units included in the control device 1.

The pathfinding unit 10 is for finding the optimum path from the present location to the destination, based on position information of the vehicle at the present time point which is positioned by the positioning device 4, position information of the destination input with the input device 3, and map information stored in the storage device 5. For example, the pathfinding unit 10 finds the shortest path by performing a Dijkstra method used as the shortest pathfinding algorithm.

For example, the pathfinding unit 10 recognizes a link where traffic congestion has occurred based on traffic congestion information, and finds the fastest path to the destination by avoiding the particular link.

The forecast traffic congestion information generating unit 11 is for generating forecast traffic congestion information containing information of a forecast traffic congestion condition in a link at a predetermined time (reference time) in the future. For example, the forecast traffic congestion information generating unit 11 generates forecast traffic congestion information for a predetermined area based on the present time and traffic information of the past stored in the traffic information database 50.

For example, the forecast traffic congestion information generating unit 11 extracts past data corresponding to conditions similar to those of the present, such as the date (of month), the day (of week), and the weather. Then, based on the extracted past data, the forecast traffic congestion information generating unit 11 forecasts the traffic congestion condition in each of the links in a predetermined area at a predetermined time point in the future.

The forecast traffic congestion information generating unit 11 creates a graph depicting information expressing the transition of the link travel time, extending back a predetermined length of time from the present time. Then, the forecast traffic congestion information generating unit 11 performs pattern matching between the present data and the past data to extract a transition pattern of the link travel time similar to that of the present. Based on the subsequent transition of the extracted pattern, the forecast traffic congestion information generating unit 11 estimates the link travel time at a predetermined time point in the future, and generates forecast traffic congestion information.

The forecast traffic congestion information generating unit 11 generates forecast traffic congestion information for all of the links in a predetermined area (for example, a two-square-km area), corresponding to the same reference time. This is because if the reference time of the forecast traffic congestion information is different for each of the links, the calculation workload increases.

For example, when the present time is 5:00 p.m. on a Friday in June, and forecast traffic congestion information of 15 minutes later is to be generated, the forecast traffic congestion information generating unit 11 refers to data corresponding to 5:15 p.m. on a Friday in June in the past.

The forecast traffic congestion information applying unit 12 is for applying the forecast traffic congestion information generated by the forecast traffic congestion information generating unit 11, to the pathfinding operation performed by the pathfinding unit 10.

For example, the control device 1 forecasts the time at which the vehicle arrives at a predetermined area, and causes the forecast traffic congestion information generating unit 11 to generate forecast traffic congestion information corresponding to the forecast time.

Subsequently, the forecast traffic congestion information applying unit 12 outputs, to the pathfinding unit 10, the forecast traffic congestion information that has been generated by the forecast traffic congestion information generating unit 11. The pathfinding unit 10 uses this forecast traffic congestion information for finding a path in a predetermined area, instead of using the traffic congestion information of the present time point received by the communication device 2.

The area setting unit 13 divides a pathfinding range by specifying plural areas in the pathfinding range. For example, the area setting unit 13 specifies areas divided by concentric circles centering around the position of the vehicle positioned by the positioning device 4.

Figure 2:
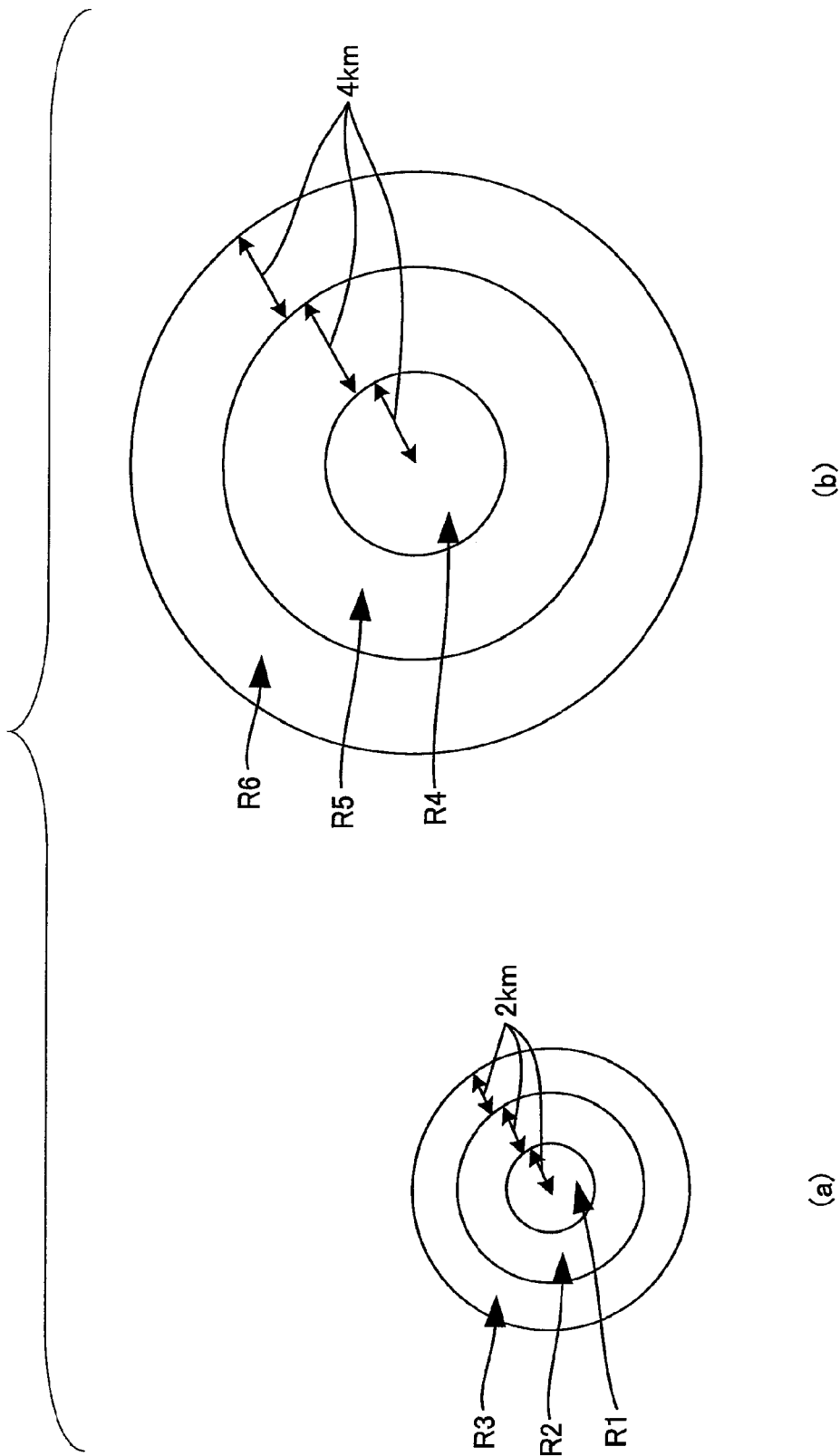
FIG. 2 illustrates examples of divided areas.

FIG. 2 illustrates examples of divided areas specified by the area setting unit 13. In FIG. 2 (*a*), the areas are defined by concentric circles in which the radius of each circle is incremented by 2 km. In FIG. 2 (*b*), the areas are defined by concentric circles in which the radius of each circle is incremented by 4 km. The incrementing range of the radius is hereinafter referred to "area-slice interval".

In FIG. 2 (*a*), an area R1 is a circular area having a radius of 2 km centering around the present location. An area R2 is a donut-shaped area located at 2 km through 4 km from the present location. An area R3 is a donut-shaped area located at 4 km through 6 km from the present location.

In FIG. 2 (*b*), an area R4 is a circular area having a radius of 4 km centering around the present location. An area R5 is a donut-shaped area located at 4 km through 8 km from the present location. An area R6 is a donut-shaped area located at 8 km through 12 km from the present location.

The example of divided areas shown in FIG. 2 (*a*) is applied to urban areas or city areas where the average vehicle speed is relatively low, or to traffic congestion peak time zones such as in the morning or in the evening. The example of divided areas shown in FIG. 2 (*b*) is applied to suburban areas or city outskirts where the average vehicle speed is relatively high, or to time zones with less traffic congestion.

As described above, the area-slice interval corresponds to a distance that a vehicle can travel within a predetermined length of time (for example, 15 minutes), which is specified beforehand for each time zone, each region, each day (of week), each season, etc. As the average vehicle speed in an area increases, the size of the corresponding area increases.

For example, the area-slice interval in Chiyoda-ward, Tokyo at 8:00 a.m. is set at 2 km, while the area-slice interval in Chiyoda-ward, Tokyo at 2:00 a.m. (midnight time zone when there is less traffic congestion) is set at 10 km.

The area-slice interval is set to a distance that can be traveled by a vehicle in 15 minutes. Alternatively, the area-slice interval may be set to a distance that can be traveled by a vehicle in 5 minutes, which corresponds to the delivery interval of VICS information, or to a distance that can be traveled by a vehicle in a longer length of time (for example, 30 minutes).

The control device 1 forecasts the time when the vehicle is expected to arrive at each area generated by the area setting unit 13. Then, the control device 1 causes the forecast traffic congestion information generating unit 11 to generate the forecast traffic congestion information for each area at the forecast time.

Then, the control device 1 causes the forecast traffic congestion information applying unit 12 to replace the traffic congestion information of the present time point with the generated forecast traffic congestion information, which is to be used by the pathfinding unit 10 for finding the path in each area.

As described above, the navigation device 100 performs pathfinding with the use of a traffic congestion condition corresponding to the time when the vehicle is expected to enter each area, and therefore highly appropriate paths can be found, and the arrival time at the destination can be forecast with increased precision.

Furthermore, with the above configuration, the time when the vehicle enters each area (area including plural links) is estimated instead of estimating the time required for the vehicle to pass through each link, and the traffic congestion condition is forecast for the estimated time. Therefore, the calculation workload can be reduced compared to the case of estimating the time required for passing through each link. Accordingly, the freedom in designing the navigation device 100 can be increased.

Figure 3:
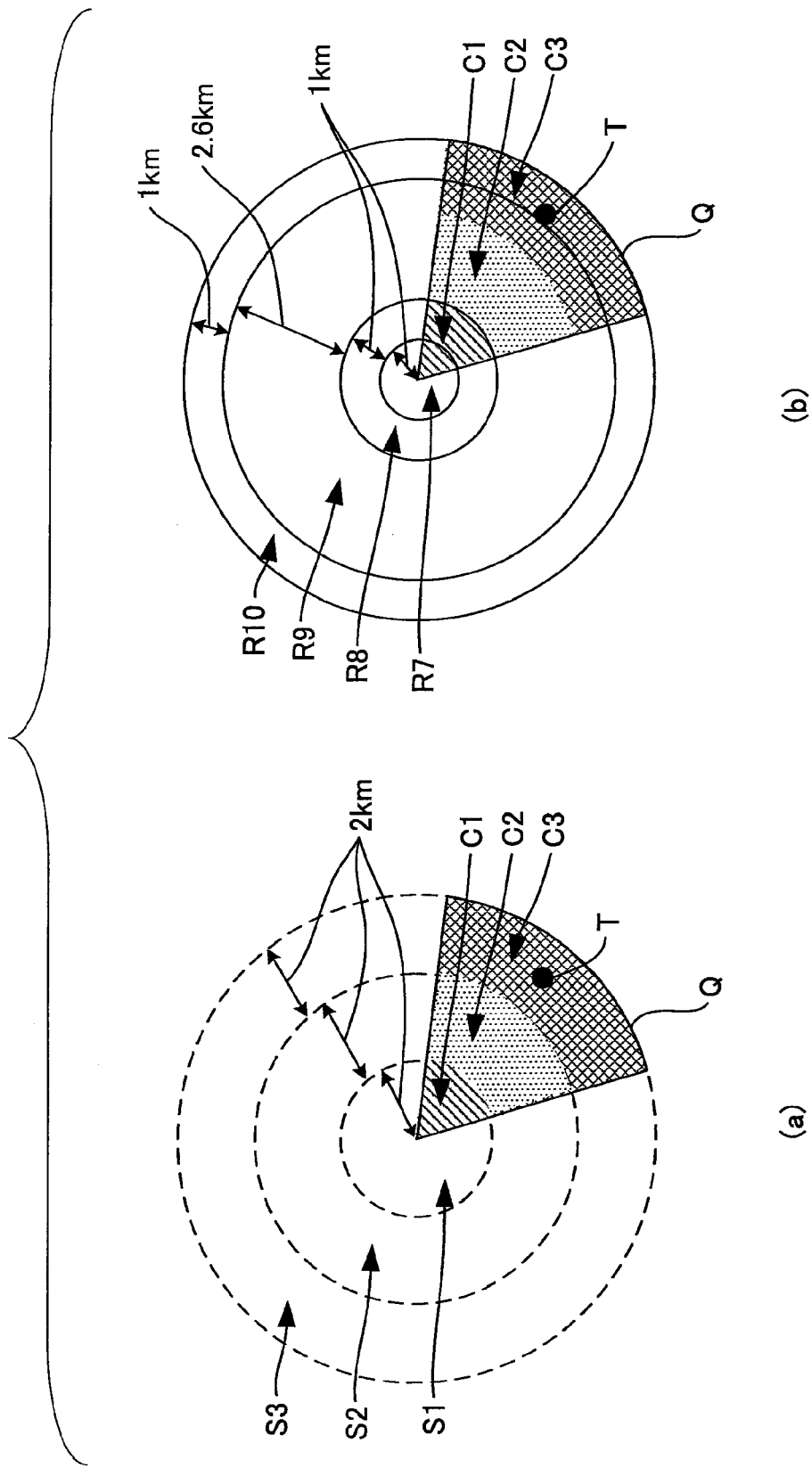
FIG. 3 is for describing a process of calculating area-slice intervals.

Next, with reference to FIG. 3, a description is given of a process performed by the control device 1, of changing the area-slice interval according to the present traffic information. Unlike the above-described case of fixing the area-slice interval to a predetermined value, this case requires a process of determining the area-slice interval, which increases the calculation workload. Nonetheless, in this case, the present traffic congestion condition can be more precisely reflected in the pathfinding operation.

The average vehicle speed calculating unit 14 is for calculating the average vehicle speed in a predetermined area. For example, the average vehicle speed calculating unit 14 calculates the average vehicle speed based on the lengths of all of the links in a predetermined area read out from the map information database 51 and the link travel times for all of the links acquired from the communication device 2 or the traffic information database 50.

FIG. 3 (*a*) is for describing a process performed by the average vehicle speed calculating unit 14 for calculating the average vehicle speed in a predetermined area. FIG. 3 (*b*) is for describing a flow of a process from when the area-slice interval is determined based on the calculated average vehicle speed to when the area setting unit 13 determines the areas for dividing the pathfinding range based on the determined area-slice interval.

First, as shown in FIG. 3 (*a*), the control device 1 generates a group of auxiliary concentric circles in which the radius of each circle is incremented by a fixed length (for example, 2 km), centering around the position of the vehicle positioned by the positioning device 4. Accordingly, a center circle S1 and donut-shaped areas S2 and S3 divided by the respective circles are set as auxiliary areas.

The group of auxiliary concentric circles is used for setting auxiliary areas. The auxiliary areas are used for setting target areas for which average vehicle speeds are calculated.

Subsequently, the control device 1 generates a sectoral (fan-shaped) area Q extending across a predetermined angle range (for example, 60°) from the present location toward a destination T input with the input device 3. The portions where each of the auxiliary areas S1 through S3 overlaps with the sectoral area Q are respectively defined as target areas C1, C2, and C3, for which the average vehicle speeds are calculated.

Subsequently, the control device 1 calculates the average vehicle speed for each target area, by dividing the total length of all links included in the corresponding target area by the total link travel time based on the most recent traffic information (i.e., the total link travel time of all links included in the corresponding target area).

In this example, the total length of links and the total link travel time are calculated in consideration of only the direction extending from the present location toward the destination T (for example, ascending direction). However, the calculation can be performed in consideration of both the ascending direction and the descending direction.

The larger the fixed length by which the radius of the auxiliary concentric circles is incremented, the less the number of set target areas. In this case, the calculation workload on the control device 1 for calculating the average vehicle speed is decreased, but the actual traffic congestion condition may not be accurately reflected in the pathfinding process.

Conversely, the smaller the fixed length by which the radius of the auxiliary concentric circles is incremented, the greater the number of set target areas. In this case, the calculation workload on the control device 1 for calculating the average vehicle speed is increased, but the actual traffic congestion condition may be accurately reflected in the pathfinding process.

The radius of the auxiliary concentric circles is incremented by a fixed length (for example, 2 km). In another example, the incremental length may be incremented by 20%, so that the radius is incremented by 2 km, 2.4 km, 2.88 km, and so on. In yet another example, the incremental length may be cyclically incremented, so that the radius is incremented by 2 km, 2 km, 2.5 km, 2.5 km, 3 km, 3 km, and so on. These examples are applicable because the further away from the present location, the less necessary it becomes to precisely calculate average speeds within narrow ranges.

Subsequently, the control device 1 calculates the travel distance for every predetermined time length (for example, 15 minutes) based on the average vehicle speed calculated for each target area.

For example, when the average vehicle speed in each of the target areas C1, C2, and C3 is 4 km/h, 20 km/h, and 4 km/h, respectively, the distance by which the vehicle travels every 15 minutes from the present location toward a destination T is calculated as follows: 1 km (travel distance of 15 minutes in target area C1); 1 km (travel distance of 15 minutes in target area C1); 2.6 km (value obtained by adding a travel distance 0.6 km of 9 minutes in target area C3 to a travel distance 2.0 km of 6 minutes in target area C2); and 1 km (travel distance of 15 minutes in target area C3).

As shown in FIG. 3 (*b*), the control device 1 applies the travel distances of 1 km, 1 km, 2.6 km, and 1 km calculated by the area setting unit 13 as the area-slice intervals, thereby specifying primary areas R7 through R10 that are divided by primary concentric circles in which the radius is incremented by each of the calculated area-slice intervals.

The primary concentric circles are used for specifying the primary areas, and forecast traffic congestion information items corresponding to different reference times are applied to the primary areas.

Accordingly, instead of using a fixed area-slice interval, the navigation device 100 determines the area-slice intervals according to the present traffic congestion condition so that the time when the vehicle is expected to enter each area is estimated more precisely, and then determines the reference time of the forecast traffic congestion information to be applied to each area.

Accordingly, the navigation device 100 can perform the pathfinding more appropriately, and can estimate the arrival time at the destination T more precisely.

Furthermore, similar to the case of using fixed area-slice intervals, the above configuration is for estimating the time when the vehicle enters each area (area including plural links) and forecasting the traffic congestion condition of the estimated time, instead of estimating the time required for passing through each link. Therefore, the calculation workload on the control device 1 can be reduced compared to the case of estimating the time of passing through each link. Accordingly, the conditions required of the control device 1 (processing speed, etc.) can be alleviated.

Figure 4:
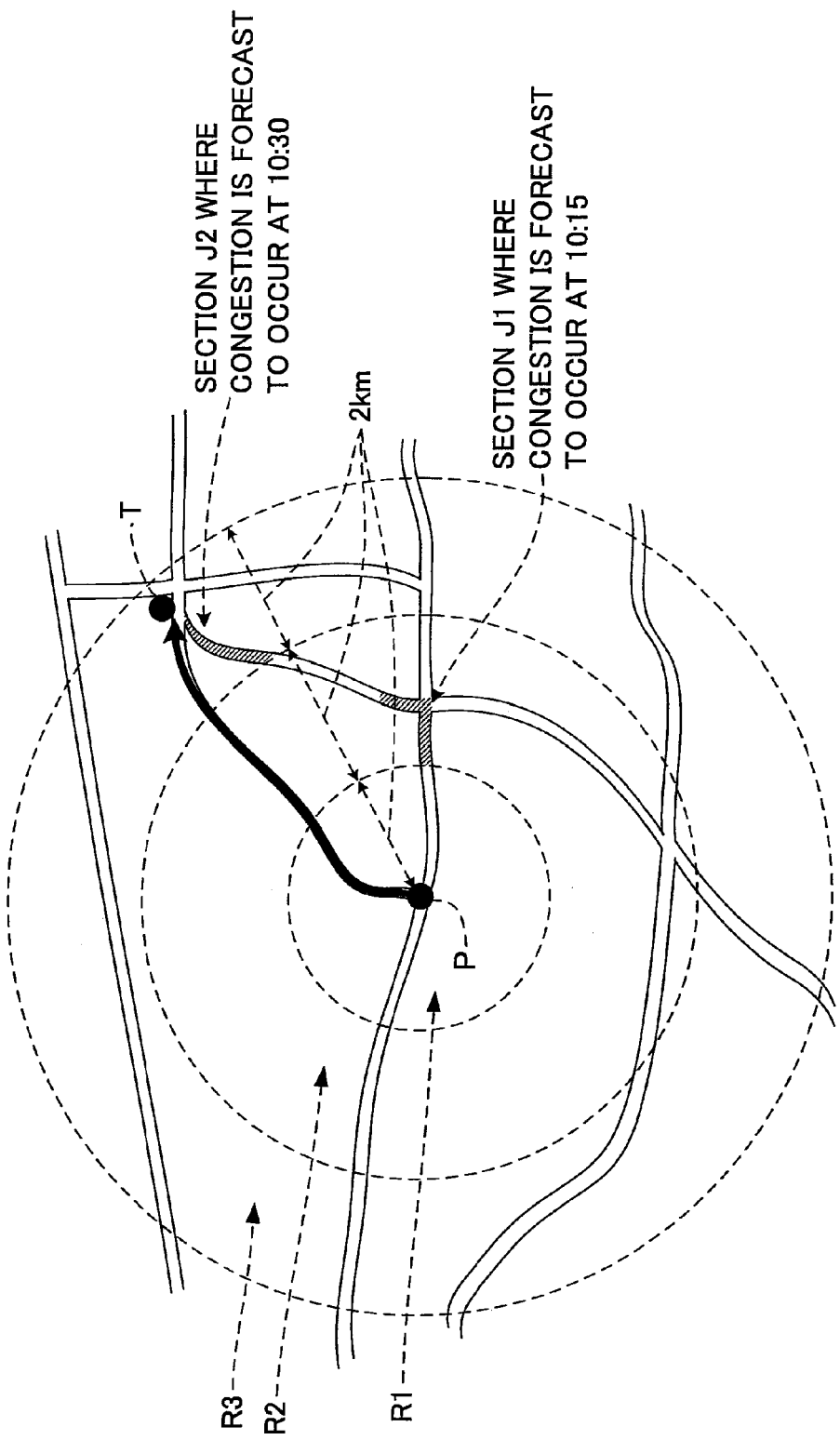
FIG. 4 illustrates a display example (part 1) of a pathfinding screen page displayed on a display device.
Figure 5:
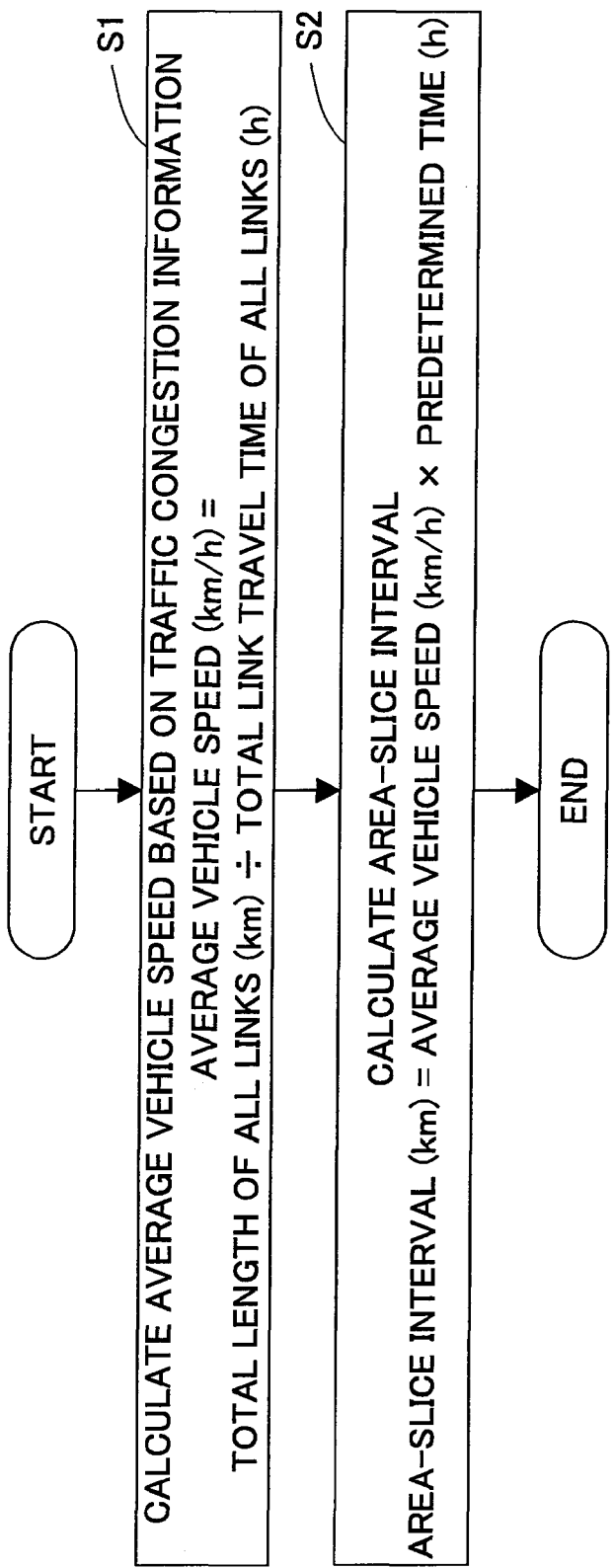
FIG. 5 is a flowchart of a process of registering an area-slice interval in a storage device in advance.
Figure 6:
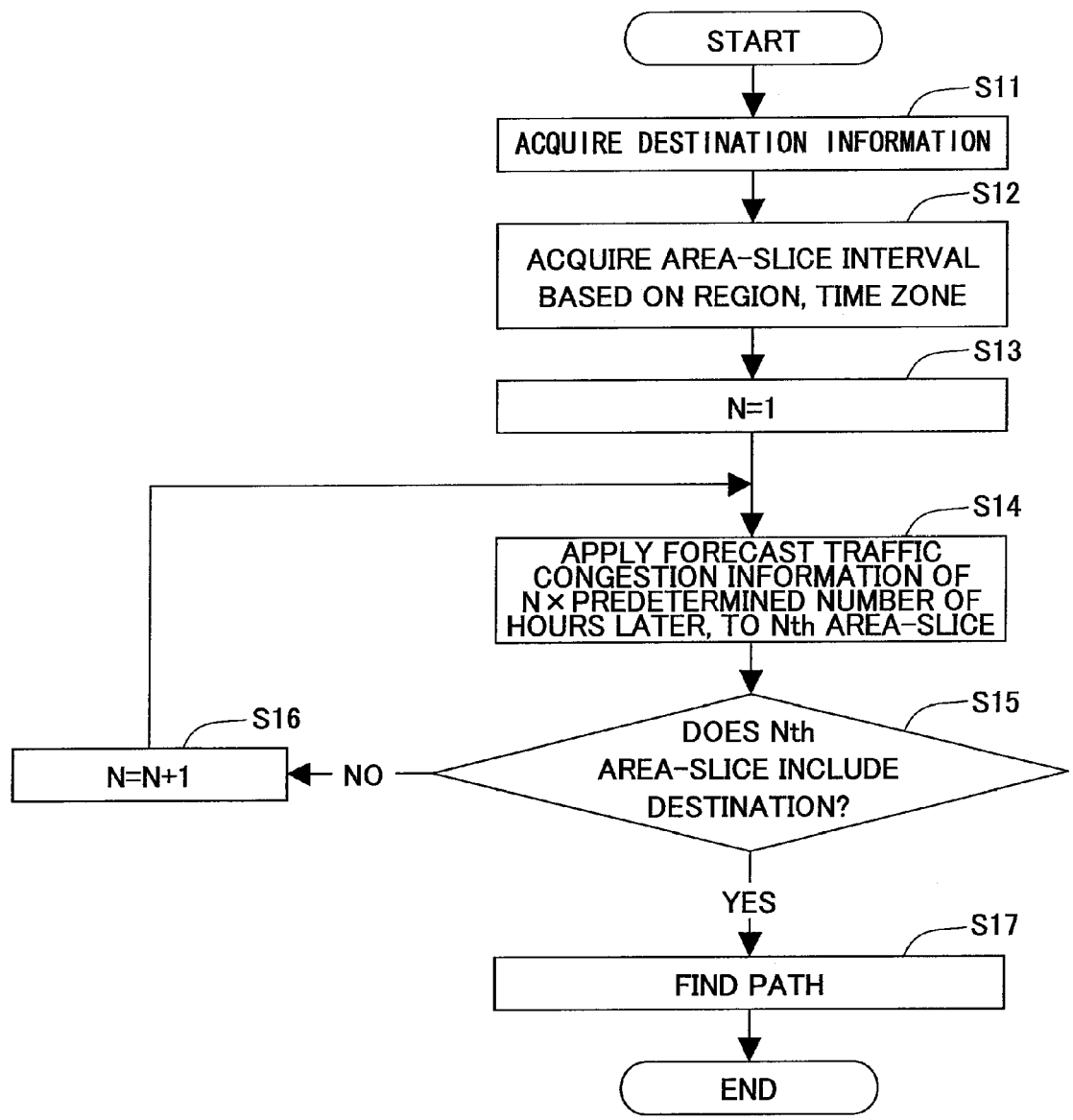
FIG. 6 is a flowchart (part 1) of a process of executing pathfinding when a destination is input.

Next, a description is given of a flow of the pathfinding process performed by the navigation device 100, with reference to FIGS. 4 through 6.

FIG. 4 illustrates a display example of a pathfinding screen page displayed on the display device 6. The concentric circles and leader lines indicated with dashed lines are shown for the purpose of description, but are not displayed in the actual screen-page.

As shown in FIG. 4, areas R1 through R3 centering around a present location P have an area-slice interval of 2 km. Traffic congestion information corresponding to the present time of 10:00 a.m. is applied to the center circle area R1, and traffic congestion information of 15 minutes later and 30 minutes later are applied to the donut-shaped areas R2 and R3, respectively. The traffic congestion sections corresponding to the respective times are highlighted with a predetermined color.

FIG. 5 is a flowchart of a process of registering an area-slice interval in the storage device 5 in advance.

First, the navigation device 100 calculates the average vehicle speed for each region and each time zone (step S1).

For example, the navigation device 100 calculates the average vehicle speed for each hour in each "10-times regional mesh" in a joint regional mesh defined by the "JIS (Japanese Industrial Standards)×0401-1976 regional mesh code" system, based on the traffic information of the past year.

For example, the navigation device 100 calculates the average vehicle speed by dividing the total length of all links in a predetermined region (for example, Chiyoda-ward, Tokyo) by the link travel time (average value) of all of the links in a predetermined time zone (for example, from 10:00 a.m. to 11:00 a.m.).

Then, the navigation device 100 calculates the area-slice interval (step S2). For example, the navigation device 100 calculates the distance that can be traveled by the vehicle within a predetermined time (for example, 15 minutes) based on the calculated average vehicle speed. This distance is applied as the area-slice interval for the corresponding region and the corresponding time zone.

For example, when the calculated average vehicle speed is 8 km/h in the time zone of 10:00 a.m. to 11:00 a.m. at Chiyoda-ward, Tokyo, the navigation device 100 sets the area-slice interval to 2 km (distance that can be traveled by the vehicle in 15 minutes).

The navigation device 100 executes the above process for all time zones in all regions across Japan to calculate the area-slice interval for each time zone in each region, and the obtained area-slice intervals are stored in an area-slice interval database.

Another computer may perform the above process to generate the area-slice interval database, and the area-slice interval database thus generated may be stored in the storage device 5 of the navigation device 100 at the time of shipment. Every time the power is turned on, the area-slice interval database may be updated by calculating the area-slice intervals based on the latest traffic information (information of traffic information database updated as needed when traffic information is received via the communication device 2).

FIG. 6 is a flowchart of a process of executing pathfinding when a destination T is input via the input device 3.

First, the navigation device 100 acquires information pertaining to the destination T that is input via the input device 3 (step S11).

Subsequently, the navigation device 100 acquires, from the area-slice interval database, an area-slice interval corresponding to the information pertaining to a present location P positioned by the positioning device 4 and the present time (for example, 10:00 a.m.) (step S12).

Subsequently, in the navigation device 100, the area setting unit 13 specifies areas R1, R2, and R3 divided by concentric circles that are incremented by the area-slice interval (2 km) acquired at step S12, and sets "1" as the area number N given to each of the areas in an ascending order starting from the closest area to the present location P (step S13).

Subsequently, in the navigation device 100, the forecast traffic congestion information generating unit 11 generates forecast traffic congestion information for the present time 10:00 a.m., or acquires the traffic congestion information based on the latest traffic information, and the forecast traffic congestion information applying unit 12 applies the forecast traffic congestion information or the traffic congestion information to the area R1 (step S14).

The areas divided by concentric circles are continuously specified until an area including the destination T is generated; the number of areas is not limited to three areas R1 through R3.

Subsequently, the navigation device 100 determines whether the area R1 including the present location P is an area including the destination T (step S15). When the area R1 does not include the destination T (No in step S15), the area number N is incremented by one (step S16), and step S14 is executed on the area R2 which is the next closest area to the present position P after the area R1.

Subsequently, the navigation device 100 applies, on the second area R2, the forecast traffic congestion information corresponding to 10:15 (15 minutes later) generated by the forecast traffic congestion information generating unit 11 (step S14), and applies, on the third area R3, the forecast traffic congestion information corresponding to 10:30 (30 minutes later) generated by the forecast traffic congestion information generating unit 11 (step S14).

When the navigation device 100 determines that the area to which the forecast traffic congestion information is applied includes the destination T (Yes in step S15), the pathfinding unit 10 finds a path from the present location P to the destination T (step S17).

Accordingly, as shown in FIG. 4, the navigation device 100 can find the path for reaching the destination T in the shortest time by avoiding the section J1 where congestion is forecast to occur at 10:15, and the section J2 where congestion is forecast to occur at 10:30.

Figure 7:
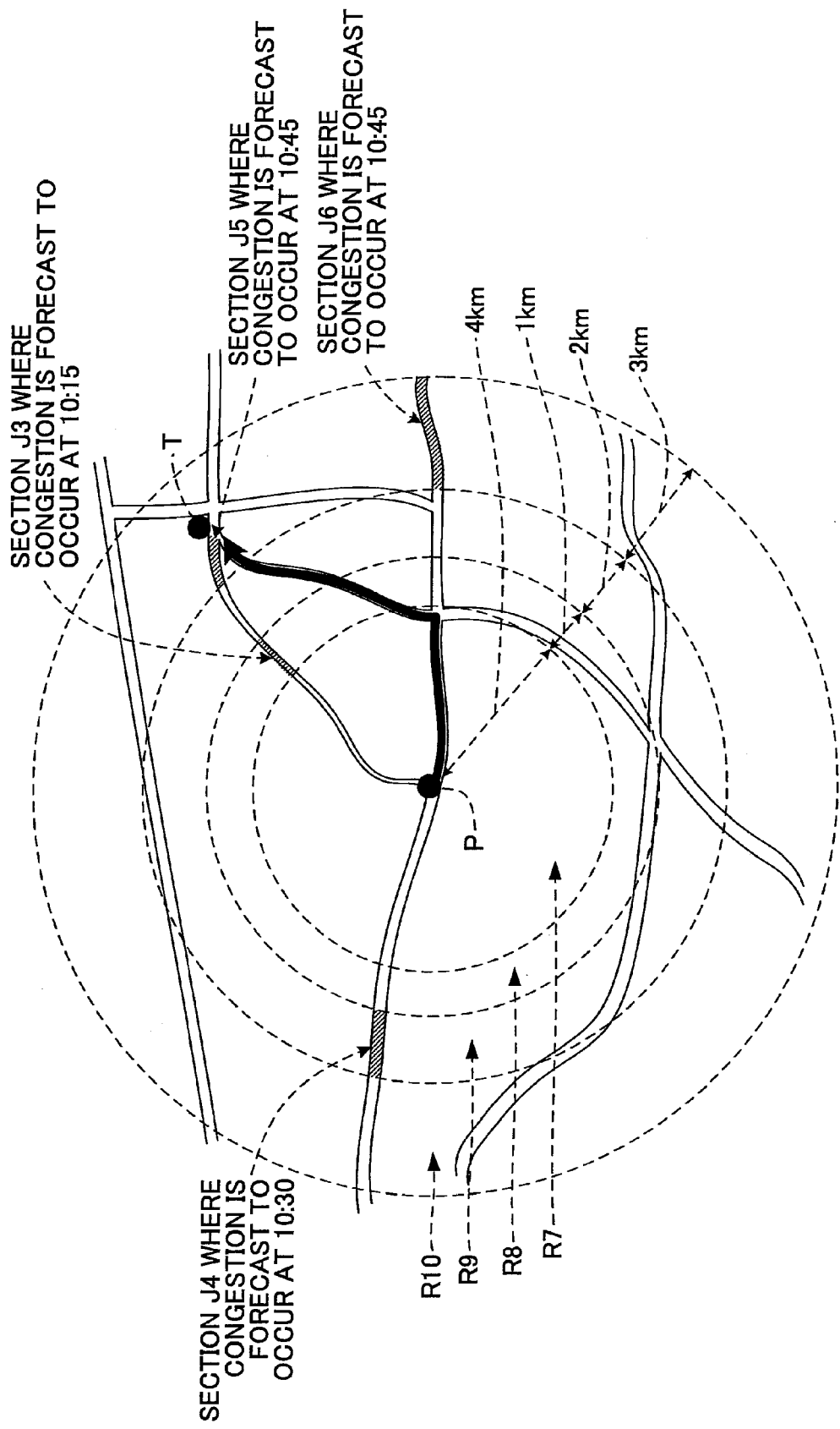
FIG. 7 illustrates a display example (part 2) of a pathfinding screen page displayed on a display device.
Figure 8:
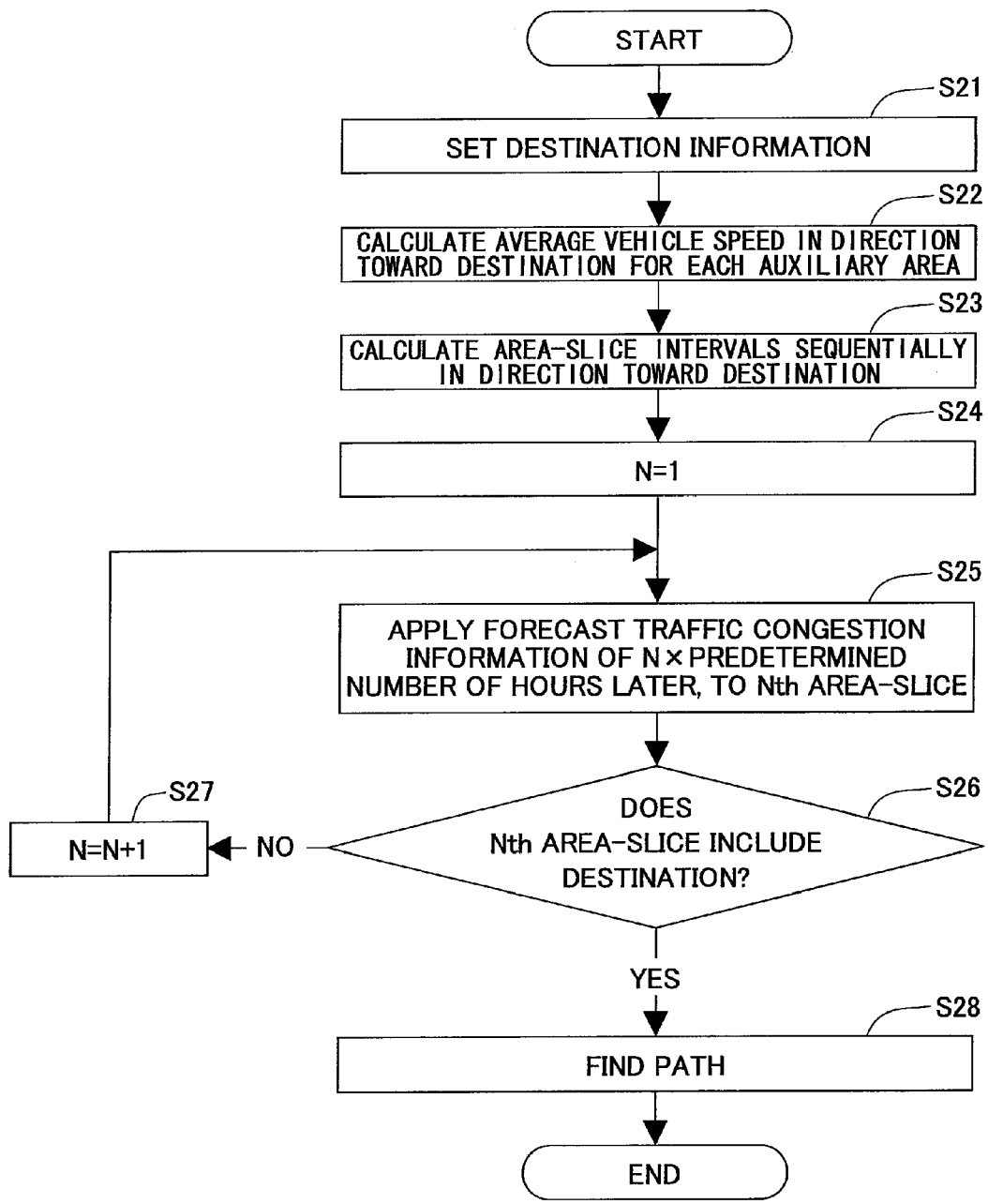
FIG. 8 is a flowchart (part 2) of a process of executing pathfinding when a destination is input.

Next, a description is given of a flow of another pathfinding process performed by the navigation device 100, with reference to FIGS. 7 and 8. This process is different from that described with reference to FIGS. 4 through 6 in that the area-slice interval is not a fixed length but is calculated based on the present traffic congestion condition.

Similar to the example shown in FIG. 4, FIG. 7 illustrates a display example of a pathfinding screen page displayed on the display device 6. The concentric circles and leader lines indicated with dashed lines are shown for the purpose of description, but are not displayed in the actual screen-page.

FIG. 7 illustrates primary areas R7 through R10 divided by primary concentric circles in which the radius is incremented by the area-slice interval calculated based on the present traffic congestion condition, instead of being incremented by a fixed area-slice interval registered in the area-slice interval database. The traffic congestion information of the present time 10:00 a.m. is applied to the center circle area R7, and the forecast traffic congestion information of 15 minutes later, 30 minutes later, and 45 minutes later are applied to the donut-shaped areas R8, R9, and R10, respectively. The traffic congestion sections corresponding to the respective times are highlighted with a predetermined color.

FIG. 8 is a flowchart of a process of executing pathfinding when a destination T is input via the input device 3. The difference between the processes of FIG. 6 and FIG. 8 is that the process shown in FIG. 6 reads and uses the area-slice interval registered in the area-slice interval database, whereas the process shown in FIG. 8 calculates the average vehicle speed in a predetermined area based on the present traffic information (step S22), and calculates the area-slice interval based on the obtained vehicle speed (step S23). The other steps in FIG. 8 are the same as the processes in the flowchart shown in FIG. 6, and are thus not further described.

First, the navigation device 100 acquires information pertaining to the destination T that is input via the input device 3 (step S21). The navigation device 100 generates plural auxiliary areas centering around a present location P, whereby auxiliary areas are divided by auxiliary concentric circles in which the radius is incremented by a predetermined length (for example, 2 km), and also generates a sectoral (fan-shaped) area (see FIG. 3) extending across a predetermined angle range (for example, 30° on either side of the destination T) from the present location P toward the destination T. The average vehicle speed calculating unit 14 calculates the average vehicle speed in each target area corresponding to where the plural auxiliary areas overlap with the sectoral area (step S22).

Subsequently, the navigation device 100 calculates the travel distance of the vehicle for every predetermined time (for example, 15 minutes) based on the average vehicle speed in each target area, and the calculated distance is applied as an area-slice interval (step S23).

As a result, the navigation device 100 calculates the area-slice intervals based on the present traffic congestion condition, so that the primary areas R7, R8, R9, and R10 have different area-slice intervals of 4 km, 1 km, 2 km, and 3 km, respectively, as shown in FIG. 7.

Accordingly, compared to the case of using a fixed area-slice interval, the navigation device 100 can apply, to each area, forecast traffic congestion information corresponding to a reference time that is more in line with the present traffic congestion condition. For example, the forecast traffic congestion sections shown in FIG. 4 are different from the forecast traffic congestion sections shown in FIG. 7. In this manner, the navigation device 100 can perform highly precise pathfinding operations that are more in line with the present traffic congestion condition.

With the above configuration, the navigation device 100 can adjust the calculation load on the control device 1 depending on whether to use a registered area-slice interval or an area-slice interval that has been calculated based on the present traffic congestion condition, and present an appropriate path to the driver in consideration of the ever-changing traffic congestion condition, while achieving a balance between the precision in pathfinding and calculation load.

The present invention is not limited to the specifically disclosed embodiment, and variations and expansions may be made without departing from the scope of the present invention.

For example, in the above embodiment, the navigation device 100, which is an in-vehicle device, has the control device 1 including the pathfinding unit 10, the forecast traffic congestion information generating unit 11, the forecast traffic congestion information applying unit 12, the area setting unit 13, and the average vehicle speed calculating unit 14. However, all or some of these units may be included in a control device provided at an external facility such as a communication center, and the navigation device 100 may be configured to receive calculation results and search results via the communication device 2.

The present application is based on Japanese Priority Patent Application No. 2006-271996, filed on Oct. 3, 2006, the entire contents of which are hereby incorporated by reference.

The invention claimed is:

1. A navigation device for dividing a pathfinding range into plural areas and performing pathfinding in consideration of congestion information, the navigation device comprising:
   an average vehicle speed calculating unit configured to calculate, based on traffic information of a road included in each of plural target areas, an average vehicle speed in each of the plural target areas corresponding to where plural auxiliary areas divided by auxiliary concentric circles centering around a present location overlap with a sectoral area extending across a predetermined angle range;
   an area setting unit configured to set the plural areas based on the average vehicle speed in each of the plural target areas;
   a forecast congestion information generating unit configured to predict plural arrival times when a vehicle reaches the corresponding areas set by the area setting unit and generate, based on traffic information, plural item of forecast congestion information corresponding to the respective predicted arrival times; and
   a pathfinding unit configured to search for a route to a destination based on plural items of the forecast congestion information generated by the forecast congestion information generating unit.

2. The navigation device according to claim 1, wherein: the area setting unit is configured to set regions divided by concentric circles centering around the present location, as the plural areas.

3. The navigation device according to claim 2, wherein:
   a radius of the concentric circles is incremented by a travel distance corresponding to a predetermined time length calculated based on an average vehicle speed in each of the target areas.

4. The navigation device according to claim 1, wherein:
   the average vehicle speed in each of the plural target areas is calculated based on lengths of links in each target area and link travel times for all of the links, and the lengths of all of the links in a predetermined area are read out from a map information database and the link travel times for all of the links are acquired from a communication device or a traffic information database.

5. A navigation device for dividing a pathfinding range into plural areas and performing pathfinding in consideration of congestion information, the navigation device comprising:
   an average vehicle speed calculating unit configured to calculate, based on traffic information of a road included in each of plural target areas, an average vehicle speed only in a sectoral area extending across a predetermined angle range corresponding to where plural auxiliary areas divided by auxiliary concentric circles centering around a present location overlap with a sectoral area extending across a predetermined angle range;
   an area setting unit configured to set the plural areas based on the average vehicle speed in each of the plural target areas;
   a forecast congestion information generating unit configured to generate, based on traffic information, forecast congestion information corresponding to a predetermined time; and
   a pathfinding unit configured to search for a route to a destination based on a plurality of forecast congestion information items, the plurality of forecast congestion information items being associated with estimated times when the vehicle enters the corresponding set areas.

* * * * *

UNITED STATES PATENT AND TRADEMARK OFFICE
CERTIFICATE OF CORRECTION

PATENT NO. : 8,452,530 B2  
APPLICATION NO. : 12/444002  
DATED : May 28, 2013  
INVENTOR(S) : Inoguchi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this
Eighth Day of September, 2015

Michelle K. Lee
*Director of the United States Patent and Trademark Office*